United States Patent [19]

Bottoms et al.

[11] Patent Number: 4,898,547

[45] Date of Patent: Feb. 6, 1990

[54] HYBRID INTERFACE ADAPTER

[75] Inventors: Stanley Bottoms, Largo; James L. Korzik, Palm Harbor, both of Fla.

[73] Assignee: Paradyne Corp., Largo, Fla.

[21] Appl. No.: 760,485

[22] Filed: Jul. 30, 1985

[51] Int. Cl.⁴ ............................................. H01R 25/00
[52] U.S. Cl. ..................................... 439/652; 439/70; 439/189
[58] Field of Search ........... 339/154, 155, 156, 157 R, 339/17 R, 17 C, 17 LC, 159 C, 147 R, 176 R, 176 M, 17 CF

[56] References Cited

U.S. PATENT DOCUMENTS

| | | | |
|---|---|---|---|
| 3,601,762 | 8/1971 | Eshelman | 339/156 R |
| 3,671,812 | 6/1972 | Peluso et al. | 339/157 R |
| 3,671,918 | 6/1972 | Mitchell | 339/157 R |
| 4,125,313 | 11/1978 | Sipp et al. | 339/176 M |
| 4,326,765 | 4/1982 | Brancelone | 339/147 R |
| 4,415,217 | 11/1983 | Clabburn et al. | 339/157 R |
| 4,447,105 | 5/1984 | Ruehl | 339/147 R |
| 4,471,408 | 9/1984 | Martinez | 339/17 CF |
| 4,516,816 | 5/1985 | Winthrop | 339/17 CF |

*Primary Examiner*—David Pirlot
*Attorney, Agent, or Firm*—Kane, Dalsimer, Sullivan, Kurucz, Levy, Eisele & Richard

[57] ABSTRACT

A hybrid interface adapter is provided for interfacing a digital assembly to a standard data and control bus. The adapter includes level translating circuits for translating signal levels between the assembly and the control bus. The adapter also has a first port for connection to a bus through a standard connecter and a second port for connecting and mounting the adapter to the digital assembly.

4 Claims, 3 Drawing Sheets

HYBRID INTERFACE ADAPTER

BACKGROUND OF THE INVENTION

1. Field of Invention

This invention pertains to an adapter for interconnecting an electric assembly to a common data and/or control bus and more particularly to an adapter having one or more electronically active elements.

2. Description of the Prior Art

Devices are now frequently made which have several digital assemblies which exchange signals using a standardized control and/or data bus such as RS232 or IEEE488. However, very often the signals generated or used by the assemblies are often not compatible with the corresponding signals of the bus. Therefore, in order to interface an electronic assembly with a bus, signal translating means must be provided as part of the assembly, which uses up precious space (or "real estate") in addition to a mechanical connector which provides the actual signal paths between the assembly and the bus. Furthermore, the signal translating means increases the complexity of the assembly and increases the time necessary to trouble-shoot the assembly.

OBJECTIVES AND SUMMARY OF THE INVENTION

In view of the above, it is a principal objective of the present invention to provide an interfacing adapter between a digital assembly and a standard bus which eliminates the need for signal translating means.

This objective is achieved by the present invention by providing an adapter having a first port including a standard coupling means, a second port for attaching the adapter to a PC board and a level translating means disposed between said two parts. The level translating means may comprise discrete devices or a single custom-made integrated chip.

DETAILED DESCRIPTION OF THE INVENTION

Figure 1:
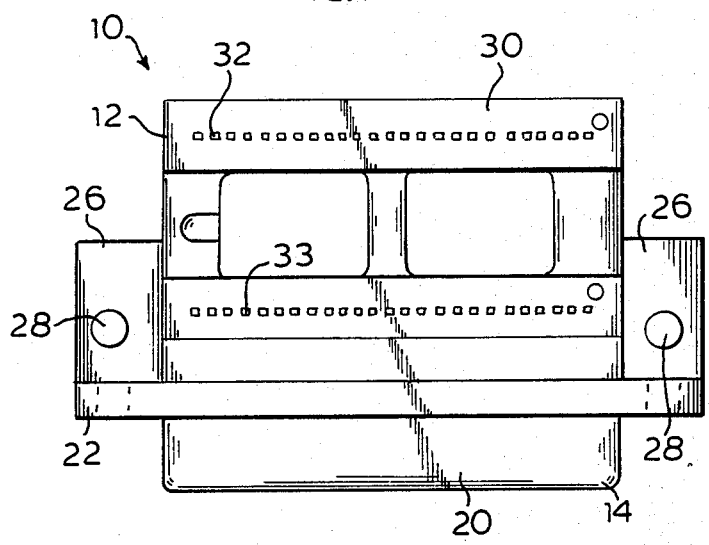
FIG. 1 shows a top view of an interface adapter constructed in accordance with the invention without the IC chip.
Figure 2:
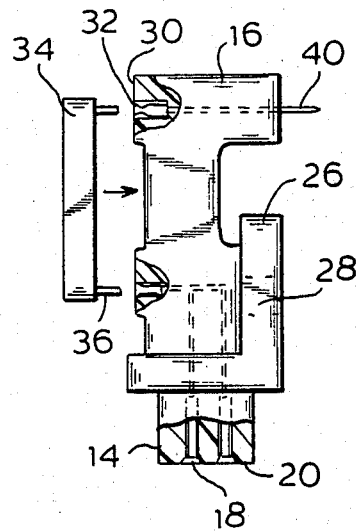
FIG. 2 is a side view of the adapter of FIG. 1.
Figure 3:
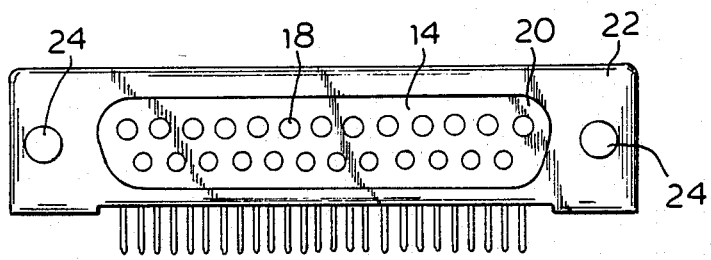
FIG. 3 is a front view of the adapter of FIG. 1.

Referring now to the drawings, and more particularly FIGS. 1, 2 and 3, according to this invention, an interface adapter 10 comprises a unitary body 12 with a first port 14, for coupling the adapter to a standard bus and a second port 16 for coupling or mounting the adapter to a PC board. The body may be made of a plastic, non-conductive material by standard manufacturing techniques such as molding.

The first port 14 is designed to couple to a standard bus by normal connection means such as a male subminiature D-connector. Therefore, the port 14 is provided with a plurality of holes 18 extending in parallel from adapter face 20 into body 12. The holes are arranged along two parallel horizontal rows, the holes of one row being staggered with respect to the holes of the other row, as shown in FIG. 3.

A wall 22 is provided behind port 14 in parallel with face 20. The wall is provided with two screw holes 24 used to secure mounting hardware for connection to said miniature D male connector (not shown).

The adapter is also provided with two bottom walls 26 disposed at the bottom of the adapter, perpendicular to wall 22. Walls 26 are provided with screw holes 28 for mounting the adapter 10 to a PC board (not shown).

The adapter has a top surface 30 constructed and arranged for supporting the level translation means. For example, the surface may be provided with two rows of holes 32, 33 for supporting a custom made integrated chip. In this case, an integrated circuit 34 may be mounted on the adapter in a piggy-mount fashion as shown in FIG. 2. As usual, the integrated circuit 34 is provided with parallel pins 36 which are pushed into holes 32, 33 as shown.

Finally, second port 16 may be provided with means for interconnecting the adapter to a PC board such as a plurality of pins 40. As shown in FIG. 2, pins 40 may be oriented at a right angle to holes 18 to reduce the overall space required for the adapter.

Figure 4:
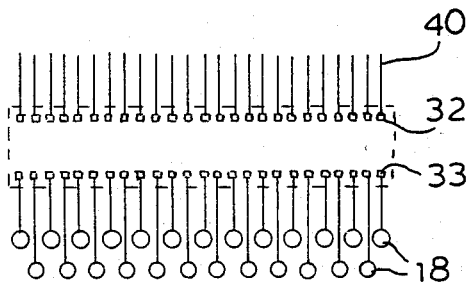
FIG. 4 shows a connection diagram for the adapter of FIG. 1.
Figure 5:
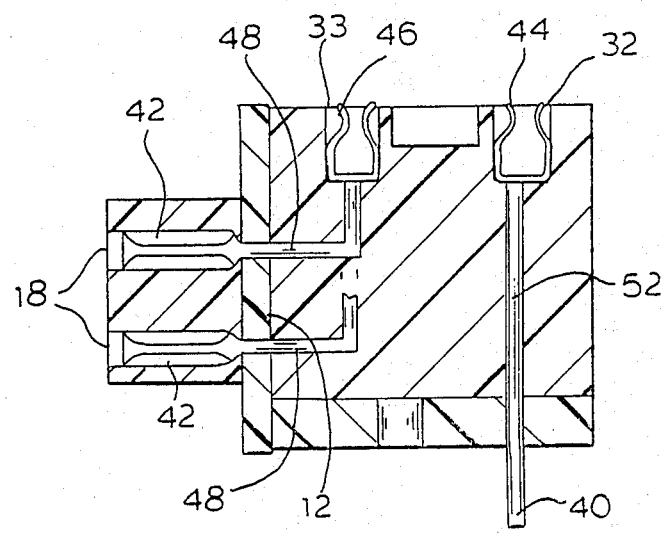
FIG. 5 shows an enlarged side-sectional view of the adapter of FIG. 1.

The holes 18 are provided with conductive elements for connecting each hole to one of the holes of row 33. Similarly each pin is electrically connected to a corresponding hole of row 32 as shown in FIG. 4. More particularly, as shown in FIG. 5, each hole 18 may be provided with clips 42, and each hole 32, 33 may be provided with clips 44 and 46 respectively, these clips being adapted to receive and make electrical contact with corresponding pins on IC 34. Clips 42 are connected to clips 46 by L-shaped conductive elements 48 embedded in the body of the adapter 12. Similarly, each pin 40 is provided with a conductive extension 52 for connecting the pin 40 to a corresponding clip 44. Clips 44 and 46 are used to mount IC 34. Clips 42 are used as connecting means to a male connector as described above.

Figure 6:
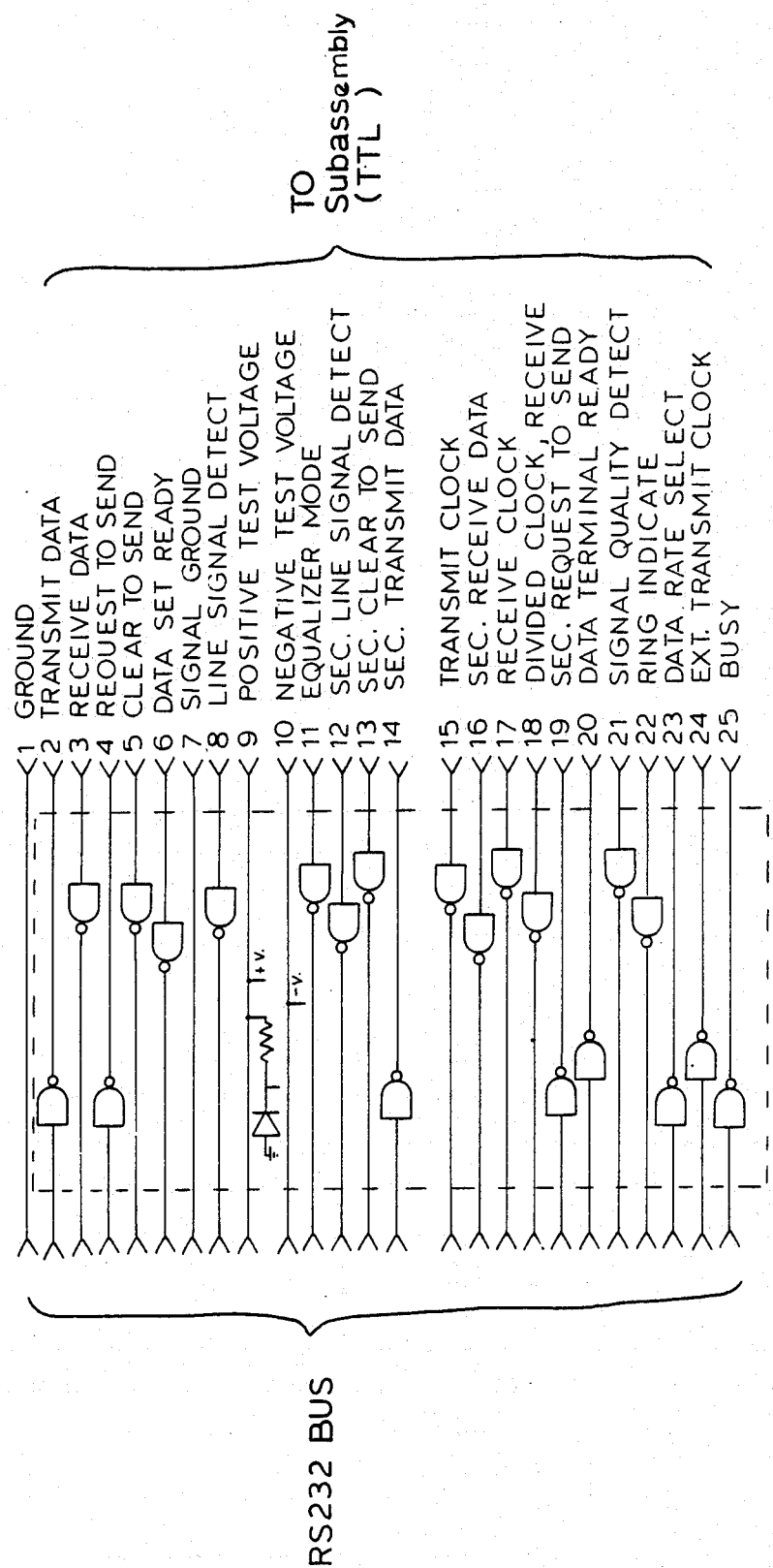
FIG. 6 shows a schematic diagram of an integrated circuit chip.

Typically, there are 25 holes 18, one for each of the lines of a typical RS232 bus. The various functions designated for each line are shown in FIG. 6. For example, line 1 is the ground line, line 2 is dedicated to TXD (transmit data) etc. As previously mentioned, the IC 34 is provided to translate the signals from an assembly (for example, at TTL signal levels) to RS232 bus levels. For this purpose, most of the lines include a NAND gate 54 as shown. In addition, the positive test voltage line 9 is used to provide a +5 voltage supply through a resistor 56 and zener diode 58 for internal circuit requirements.

As previously mentioned, port 14 is adapted to mate with a standard D-type miniature male connector. Therefore in order to match holes 32 to holes 18, holes 33 must be spaced about 0.0545" apart, center to center. The recommended spacing between rows 32 and 33 is about 0.6". Since the standard IC's have pins spaced 0.1" apart, IC 34 must be custom made. Alternatively discrete components may be used instead.

Obviously, numerous modifications may be made to the invention without departing from its scope as defined in the appended claims.

We claim:

1. A hybrid interface adapter for coupling circuit lines carrying circuit signals of a first level to a bus having lines for carrying bus signals at a second level different from said first level comprising:

a body having a surface with first and second groups of holes;

a first port integrally secured to said body and having a third group of holes and a plurality of conductive elements for connecting each of said third group of holes to one of said second group of holes whereby said second group of holes may be coupled through said third group of holes to a bus by normal connection means;

a second port integrally secured to said body and having means for connecting the adapter to a PC board, said connecting means being electrically connected to said first group of holes; and a signal level translating means removably connected to said first and second groups of holes, said signal level translating means being capable of being mounted in substantial abutment to said first and second groups of holes, said signal level translating means functioning to translate said circuit signals of a first level to said bus signals of a second level wherein said connecting means comprises a plurality of pins and wherein said plurality of pins are arranged perpendicularly to said third group of holes and wherein said third group of holes is arranged in two parallel rows, the holes of one row being staggered with respect to the holes of the other row.

2. The adapter of claim 1 wherein said signal level translating means comprises a single integrated circuit.

3. The adapter of claim 1 wherein said signal level translating means comprises a plurality of discrete elements.

4. The adapter of claim 1 wherein said first and second groups of holes are each arranged in a row, each hole having a conductive clip attached thereto.

* * * * *